United States Patent
Kuo et al.

[19]

[11] Patent Number: 6,003,134
[45] Date of Patent: Dec. 14, 1999

[54] SECURE OPEN SMART CARD ARCHITECTURE

[76] Inventors: Chih-Cheng Kuo; Minwen Lo, both of 7 Maidens Bower Ct., Potomac, Md. 20854

[21] Appl. No.: 09/000,872

[22] Filed: Dec. 30, 1997

Related U.S. Application Data

[63] Continuation-in-part of application No. 08/782,063, Jan. 13, 1997, Pat. No. 5,754,762.

[51] Int. Cl.$^6$ ...................................................... H04L 9/00
[52] U.S. Cl. ................................ 713/200; 380/4; 380/23; 380/24; 380/25; 380/49; 709/100
[58] Field of Search .............................. 713/200; 380/23, 380/24, 4, 49, 25

[56] References Cited

U.S. PATENT DOCUMENTS

| | | | |
|---|---|---|---|
| 4,827,512 | 5/1989 | Hirokawa et al. ..................... | 713/200 |
| 5,014,312 | 5/1991 | Lisimaque et al. ..................... | 380/25 |
| 5,131,091 | 7/1992 | Mizuta ..................... | 713/20 |
| 5,168,151 | 12/1992 | Nara ..................... | 235/492 |
| 5,202,923 | 4/1993 | Kuriyama ..................... | 380/49 |
| 5,274,817 | 12/1993 | Stahl ..................... | 709/100 |
| 5,293,577 | 3/1994 | Hueske et al. ..................... | 380/25 |
| 5,335,331 | 8/1994 | Murao et al. ..................... | 712/213 |
| 5,430,852 | 7/1995 | Watanabe et al. ..................... | 712/233 |
| 5,452,431 | 9/1995 | Bournas ..................... | 711/115 |
| 5,471,045 | 11/1995 | Geronimi ..................... | 380/4 |
| 5,500,949 | 3/1996 | Saito ..................... | 711/100 |
| 5,542,081 | 7/1996 | Geronimi ..................... | 712/37 |
| 5,557,743 | 9/1996 | Pombo et al. ..................... | 713/200 |
| 5,559,989 | 9/1996 | Sourgen et al. ..................... | 711/154 |
| 5,590,312 | 12/1996 | Marisetty ..................... | 395/500.44 |
| 5,600,818 | 2/1997 | Weikmann ..................... | 711/163 |
| 5,615,263 | 3/1997 | Takahashi ..................... | 380/4 |
| 5,615,381 | 3/1997 | Iijima ..................... | 380/4 |

*Primary Examiner*—Ly V. Hua
*Assistant Examiner*—Wasseem Hamdan
*Attorney, Agent, or Firm*—Peter Gibson

[57] ABSTRACT

Multiple applications upon an IC microprocessor are protected with bi-modal CPU operation, either application or system mode, using an operation flag determining the mode and dependent upon a mode change interrupt which clears all working memory unnecessary to operation in the next mode. Access authorization setting program and data memory boundaries according to the particular custom command in comparison registers is utilized in application initialization. From application mode, data files are accessed only through a system subroutine. Request of an address beyond the territory assigned to the custom command utilized results in a hardware interrupt which clears all working memory and registers unnecessary to forward a status word indicating abnormal termination. Application completion forwards the result with a status word indicating successful completion. Operation results either in successful completion or abnormal termination without possible access of any other application contained upon the IC card (10).

20 Claims, 4 Drawing Sheets

FIG 3

1. Enter custom command with external interface device.
2. Recognize command in system mode as corresponding to one particular application.
3. Authorize corresponding application program by verifying access condition in the system mode;
4. Request in system mode for application program.
    a. Place requested address in a register;
    b. Place parameters in registers/working memory;
    c. Set program and data memory boundaries for this application in comparison registers.
    d. Clear all registers and working memory not used in a - c.
5. Mode change interrupt.
    a. Place return address in stack;
    b. Place original operation flag (system mode) in stack which effectively changes operation flag to application mode.
6. Process custom command application program.
    a. Software interrupt service routine: execute application program with the address placed in the register by step (4.a);
    b. Place result in registers and/or working memory;
    c. Clear all registers/working memory not used in previous step (6.b).
7. Return from interrupt.
    a. Restore operation flag to system mode;
    b. Return to system with stacked return address.
8. Forward result to external interface device.

FIG 4

1. Request made in application mode for system subroutine.
    a. Place requested subroutine indicia in a register;
    b. Place parameters in registers and/or working memory;
    c. Clear all registers and working memory not used in substeps (a & b).
2. Mode change interrupt.
    a. Place return address in stack;
    b. Retrieve operation flag (system mode) from stack thereby changing operation mode from application program to system.
3. Retrieve requested address; terminate if unauthorized.
4. Process system subroutine.
    a. Place result in registers and/or working memory;
    b. Clear all registers and working memory not used in previous step.
5. Return from interrupt.
    a. Place system flag in stack which restores application mode;
    b. Retrieve return application address from stack.

FIG 5

1. Invalid access attempt recognized by comparison register.
2. Hardware interrupt generated.
3. Process hardware interrupt service routine.
    a. Return Error message of status work to external interface device;
    b. Reset CPU;
    c. Clear all registers and working memory.

SECURE OPEN SMART CARD ARCHITECTURE

This application is a continuation in part of application Ser. No. 08/782,063, filed Jan. 13, 1997, now U.S. Pat. No. 5,754,762.

BACKGROUND OF THE INVENTION

1. Field of the Invention

The present invention relates generally to 'smart cards' containing integrated circuit (IC) microprocessors, more particularly to operating systems for such intended to enable multiple applications and most specifically to such systems intended to enable access to particular applications by use of a selected 'custom' command while denying access to any of the other applications encompassed.

2. General Background

The use of IC microprocessors embedded in a plastic card similar dimensionally to conventional credit cards, which are characterized by the capability of magnetically storing information, has more recently emerged as a valuable product for facilitating financial services primarily. Cards with an IC microprocessor embedded inside and with external contacts for communication with an interface device are known commonly as smart cards or IC cards. The microprocessor utilized possesses the ability to hold an operating program and other information in volatile memory alterable by a CPU (Central Processing Unit) which possesses 'hard-wired' control circuitry. The CPU and the various types of memory together comprising the microprocessor may all be contained by a single IC 'chip'.

Smart cards possess the capability of modifying data stored in memory in response to communication with an interface device. Smart cards also, in contrast to conventional cards which store information magnetically, require an electrical energy supply which is typically provided by an external interface device. In order to safeguard against unauthorized use of a smart card a 'custom command' or code, created or selected by the owner, is required to access the operating program. This practice is considered to resemble closely that utilized to prevent unauthorized use of conventional ATM (Automatic Teller Machine) access cards wherein a numeric code is entered into an ATM after the magnetically stored information on the card is read by the machine in order to verify authorized access.

ATMs dispense paper currency and deduct a corresponding amount from a financial account held by the user, and also make information available regarding financial accounts, typically by printing the information requested upon a slip of paper dispensed from the machine. Other, more sophisticated, ATMs are known which enable transactions between accounts and which provide information upon a display screen, for example, however, a record of any information, including that for any transaction conducted with the machine, cannot be made upon a conventional ATM card while such records can be created and maintained within a smart card.

Current smart card technology includes the capability of multiple application use and the ability to enter into non-volatile memory a custom command chosen by the user. However, these cards either have a fixed operating system which does not include the ability to enter into non-volatile memory any custom command or the custom commands are public to all applications. Current smart card hardware design does not ensure restriction of each custom command to a particular application. Any application may be accessed by any custom command. furthermore, each custom command may bypass security control and dump or otherwise alter all volatile memory upon the card.

Discussion of the Prior Art

Because the present invention is an improvement over the invention disclosed in the application for U.S. patent Ser. No. 08/782,063 and because this improvement is considered to be unknown in the prior art; the references cited in examination of that application, the discussion of the prior art included in the background of the invention section of that application along with the references cited in the petition to make that application special are considered to comprise the most pertinent prior art known to the present applicants. The references cited by the applicants in both the above referenced application for patent and the petition to make that application special were U.S. Pat. Nos.: 4,827,512 issued to Hirokawa et al.; 5,131,091 issued to Mizuta; 5,274,817 issued to Stahl; 5,335,331 issued to Murao et al.; 5,430,852 issued to Watanabe et al.; 5,452,431 issued to Bournas; 5,471,045 issued to Geronimi; 5,557,743 issued to Pombo et el.; 5,559,989 issued to Sourgen et al.; 5,600,818 issued to Weikmann; 5,615,263 issued to Takahashi; 5,615,381 issued to lijima.

U.S. Pat. No. 4,827,512, issued to Hirokawa et al. considers that "(i)n the conventional IC card, the function program is stored in a program memory comprising a mask ROM in or outside the control element. For this reason, if the function program for decrypting data is stored in the IC card, the encrypting method cannot be modified. " (Col. 1, lines 25–29) It is further considered therein that use of multiple CPUs for multiple operating programs is impractical and that "(t)herefore, strong demand has arisen for a technique for storing and executing a new function program in addition to the already stored function program." (Col. 1, lines 35–37)

In the effort to achieve this goal, Hirokawa et al. distinguish between "the user program area" and "the system program area" in the memory upon the card and use a "command or response text" "transmitted between the IC card and a host system" which "includes a flag indicating that the text is written in the user program area or the system program area." A "conversion table for a function code and the start address of a program" is also included in memory (Abstract). The purpose is to allow a new function code, which is understood as equivalent to a password or a custom command in the currently claimed subject matter, to be added without inadvertent or other modification of the existing function codes which are in mask ROM so that IC cards may be customized by the user and mass production of the cards still facilitated. The "user card area" is understood as having been intended for the password or custom command.

This relatively early disclosure, filed Oct. 6, 1986, is concerned with the practicalities of a simple IC card with just one program or application, as it is known in the present invention, and the main object of the present invention, that of providing secure operation for a plurality of custom commands each associated with a separate application, is hence not actually addressed. However, the ability of the user to enter a password or custom command in order to secure any application held in the unalterable ROM is required of any smart card and the manner in which this is done by Hirokawa et al. is notable. Different memory areas upon the ROM of the IC card are defined, a flag is used to distinguish between operation in these two different areas, and a "conversion table for a function code and the start address of a program" is utilized.

U.S. Pat. No. 5,131,091 issued to Mizuta discloses use of "data for protecting software" "written into a ROM" "in an IC card" which also possesses RAM (random access memory) which "is responsive to the same select signal that is applied to the software protecting ROM". Protection of these "data" or what is considered to constitute the functional equivalent to a password or a custom command is provided by exclusive-OR gating of the output of ROM and RAM so one cannot "decode the software key" (Abstract). This approach to protection is basically the opposite of the approach used by many disclosures known in the prior art which rely upon the matching of a key or password between two or more files or memory areas as is implicit to the system disclosed by Hirokawa et al. discussed above.

U.S. Pat. No. 5,274,817 issued to Stahl discloses a subroutine call which utilizes an interrupt wherein the subroutine address is placed in stack along with the return address which is quite similar to the mechanics of the interrupt of the present invention. Stahl also discloses a means of verification prior to return to program which is similar to the verification of access authorization prior to return to the application mode in the presently claimed subject matter in that a "signature word" placed in stack is compared with the subroutine address called prior to return to the main program.

U.S. Pat. No. 5,335,331 issued to Murao et al. similarly includes 'multi-mode' operation in which each mode is concerned with a set of instructions. The objective is to avoiding increasing the size of the instructions beyond eight bits while obtaining more instructions than the number allowed by eight bits. Plural instruction sets are provided to achieve this object and a particular 'mode' is associated with each. This is contrasted with the bi-modal operation of the present invention wherein one mode is system mode and the other is application mode, the system being the host system to which the IC card is connected in use and the application being essentially a program held in memory upon the card.

The various 'modes' in the system disclosed by Murao et al. are selected by "mode switch signals" which are produced by the "execution control means". A third element called "a predecoder" receives "the operation mode information from the mode memory means" (claim 1). This language seems duplicative but essentially one perceives that the various 'modes' are determined by a first instruction, whether known as a "mode switch signal" or "operation mode information" which simply determines which instruction set is to be utilized. The crux of the matter is that of hierarchy which is common to many operating systems for computers generally and is not equivalent to the bi-modal operation of the present invention which signifies whether an application held upon the IC card is being processed by the CPU on the card or whether the host system to which the IC card is connected in use is providing memory, programs or information accessed by the CPU on the IC card.

U.S. Pat. No. 5,430,852, issued to Watanabe et al. and assigned to NEC, was found as cited recurrently in the search of the prior art represented herein. Watanabe et al., and NEC, the assignee, have a number of patents in the field, this one cited being merely the latest known to the present applicant. This reference discloses, in what is considered to be rather difficult language, a system which is perhaps best described in the invariant preamble of the first two independent claims: "A microprogram control system comprising a plurality of microprogram control units only one of which being active at a time, and a plurality of arithmetic circuits each of which is controlled by a corresponding one of said microprogram control units, each microprogram control unit comprising:" (claims 1 & 5).

The other independent claims of this patent possess similar preambles which are restricted to only two microprogram control units. Each microprogram control unit is associated with one arithmetic circuit in memory and a "condition register for storing status information given as a branch condition". There is also a "command register and a start address register" into which "a start command and a start address in the start microinstruction" "respectively" are held. "In response to the start command, the second unit stores the status information given from the first condition register into its condition register and reads out a microinstruction from its control memory based on the start address given from the start address register." (Abstract)

Since only one microprogram control unit is "active at a time" and since only two microprogram control units comprise what is perceived to be the preferred embodiments of this invention there would appear to be a resemblance to the bi-modal operation of the present invention in that one of two 'modes' is alternatively pursued. Microinstruction processing is apparently passed back and forth between two similar control units with the "status" information associated with start and address information being exchanged between congruent registers. While one control unit works away the other lies dormant. This disclosure provides, however, at least two substantially equivalent units which each possess separate registers for the start command, the start address and the "status information". The present invention utilizes a single CPU on the IC card with a single operation flag and a single stack instead of the duplicative arrangement disclosed by Watanabe et al.

U.S. Pat. No. 5,452,431 issued to Bournas discloses a "microcircuit for a multi-application chip card" possessing programmable memory subdivided into "repertory" and application regions, the former having reference code and addresses for each application. "The microcircuit also comprises apparatus for inhibiting any command for the programmable memory when it relates to an address outside the ... application being processed, except ... a specific priority operation" (Abstract, reference characters omitted). The matching of identifiers between memories is a conventional approach to providing security for multiple applications upon an IC card which is known in many forms.

A variation of this basic well known technique is found in the disclosure of Geronimi, U.S. Pat. No. 5,542,081. Rather than utilizing an identifier associated with a memory address, a "logic lock" which is the logical opposite of an identifier is used. The conventional use of an identifier requires that an AND identification exist in order to allow a program to be run. In the disclosure of Geronimi an OR logic is applied to the memories concerned and if a "logic lock" shows up in either abnormal termination of operation ensues. This disclosure is hence considered a twist upon the well known usage of a password or custom command as it is known in the presently claimed subject matter. An earlier disclosure by Geronimi uses the more conventional approach of identification by address of memory requested being either valid or not to the custom command utilized.

This Geronimi patent cited is entitled 'IC Card Designed to Receive Multiple Programs in a Programmable Memory' but the programs are layered and multiple applications, in the sense of the present invention, are not actually contemplated. The entire system is described as "a microprocessor-based chip card that provides several different functions at different hierarchical levels." In this disclosure "filtering instructions" contained in ROM read "filter addresses" within specified EEPROM memory zones The EEPROM is "capable of containing not only data but also a code that can be executed by the microprocessor." The filter instructions read filter addresses and "(d)epending on the contents of this (filter) zone the program will be routed, or not routed, towards the (code) zones . . . (t)hus information is recorded at only one address of the EEPROM in order to control accessibility to the different functions of the circuit." (Abstract)

It is hence understood that access to each zone in EEPROM containing programs is dependent upon the filter address read and, further, that the filtering instructions governing which such address is read is altered at different stages, first by the manufacturer of the IC, secondly by the IC card manufacturer, thirdly by an institution providing the financial or other services the card facilitates, "and the final user . . . will finally be able to use a fourth level of functions." (Col. 1, lines 26–29) The "different hierarchical levels" are hence seen to relate to level of manufacture and use and the prospect of multiple applications available to the end user is clearly not addressed.

U.S. Pat. No. 5,557,743 issued to Pombo et al. discloses a protection circuit for use in a microprocessor of a type used in a communication device which utilizes a flag to recognize whether "instruction code is generated from an internal memory source or an external memory source" (Abstract). Origin from internal ROM is further determined and if the instruction originates from there access to EEPROM is allowed and protected by "freezing the address bus" "and floating the data bus" "to the external memory". Access is denied if the instruction originates from the external memory. This seems an effective means of securing the contents of EEPROM from an outside intrusion upon a communication device but does little to protect multiple custom commands each for a separate application upon an IC card. Pombo et al. further use a security flag and a mode flag, the former being set by the user, the latter indicating whether the device is in an "expanded mode" i.e. in communication with an external EPROM. Hence while flags for mode and security are disclosed there is no substantive functional equivalence with the operation flag and the bi-modal operation of the present invention.

U.S. Pat. No. 5,559,989 issued to Sourgen et al. discloses what is considered to be a more concrete operating system similar to the rather vaguely defined system of Bournas in that a "decision circuit" which "receives input addresses of instruction to be executed and data addresses" in Sourgen et al. clearly provides the function intended to be provided by somehow utilizing the "repertory" in Bournas. This "decision circuit" also provides for what is known as abnormal termination in the presently claimed subject matter. The "repertory" of the Bournas disclosure is considered equivalent to the buffer register in Sourgen et al. which "stores the instruction addresses and subsequently presents them to the decision circuit simultaneously with the data addresses." (Abstract)

U.S. Pat. No. 5,600,818 issued to Weikmann discloses a system which seems much different from the two discussed above but which is actually quite similar though more detailed. Weikmann specifies that there is memory for an operating system and at least one other memory for an individual program or application as it is known in the presently claimed subject matter. In place of the "repertory" of Bournas and the use of a buffer register read by the "decision circuit" of Sourgen et al. Weikmann specifies two comparator registers, one for the operating system memory, the other for the program memory. Instead of the decision circuit of Sourgen et al. there is "a circuit for monitoring a particular valid address and generating a first signal" as well as another "monitoring particular contents of a microprocessor program counter and generating a second signal" which is equivalent to the abnormal termination in the present application, this being known as "an inhibit signal" in Weikmann which is "based on said first and second signals"(Abstract).

U.S. Pat. No. 5,615,263 issued to Takahashi discloses what might be considered the most pertinent system of operation to that of the present invention except that it is not a full system of operation and it does not relate to IC cards but rather to an isolated operation within the operation of a general computer system. The pertinence to the present invention of this disclosure by Takahashi is the use of a "dual mode processor"=0 in conjunction with other processing functions wherein a "secure mode" is provided which is triggered by an interrupt from either software or hardware. The input/output is disabled by the interrupt and the "identified secure function is executed" (Abstract) which involves processing of ROM only. When completed regular processing is resumed.

U.S. Pat. No. 5,615,381 issued to lijima possesses the three elements utilized by the present application which are considered to be well known in the prior art: initialization, verification of access authorization, and abnormal termination in case of verification failure. This disclosure by lijima specifies an "IC card" with "a CPU and a memory for storing first and second programs", the latter being "provided by a card manufacturer", the former by card issuer, such as bank". In place of the utilization of a "repertory" in Bournas or the "decision circuit" of Sourgen et al. or the two "monitoring circuits" of Weikmann, lijima has "a supervisory device for determining when the instructions in the first program address instructions in the second program" which condition results in interruption of the CPU which is equivalent to abnormal termination in the present application.

Statement of Need

The review of the prior art above indicates that the control circuitry of a single IC microprocessor is determinative of enabling access to various types and zones of memory held by the IC Access to and the ability to alter ROM may be restricted to an external device, additional programs may be added and different programs may be selectively accessible at various levels as determined by altered states of ROM. However, other than by utilizing a custom code recognized as authorizing access at a given level, there is no known system in the prior art for protecting access to multiple applications.

Hence it is considered that a need therefore exists for an IC operating system possessing a control circuitry which will provide security to separate multiple applications all contained upon a single IC microprocessor such as that contained in a smart card and also provide selective, protected, access to a plurality of such applications from at a given level of use.

SUMMARY OF THE INVENTION

Objects of the Invention

The encompassing object of the present invention is the provision of a system for secure multiple application operation upon a single integrated circuit microprocessor upon a single integrated circuit microprocessor intended for use embedded in a plastic card and possessing external contact for communication with an external interface device wherein each application can define a corresponding custom command and the application provider can download any particular custom command corresponding to a particular application into the IC card. Any attempt to access the memory outside the boundaries defined for the application triggers a hardware interrupt to stop the command in order to protect the security of the card. Under application mode, a direct addressing subroutine call outside the memory boundaries defined for the particular application program utilized, including the system subroutine and custom commands corresponding to other applications, triggers generation of a hardware interrupt terminating the custom command. the system subroutine call is replaced by a mode change interrupt which provides control of the card operating system to provide the security of the application provider defined custom commands.

An auxiliary object of the present invention is the provision of a system for secure multiple application operation upon a single integrated circuit microprocessor wherein each custom command under one application is allowed to access the program memory within that application, each custom command under one application is allowed to access the data file(s) only after a system subroutine verifies the access condition, each custom command under one application being allowed access only to the working memory granted by the operating system.

Principles Relating to the Present Invention

A smart card containing an IC controlled by an embodiment in accordance with the principles relating to the present invention allows the user to enter into non-volatile memory a plurality of custom commands, each particular to a different application program held therein, sufficient to gain access to one such application program only and unable to access other application data files or custom commands. The manner in which this ability is achieved is considered to distinguish the present invention over the background or prior art.

A system for secure multiple application operation upon a single integrated circuit microprocessor has unalterable 'hard-wired' control circuitry for the central processing unit (CPU) of the microprocessor which uses an interrupt dependent flag to effect bi-modal operation between an application program mode and (host) system mode. The change of operation mode from application to system is effected with a mode change interrupt function wherein all the working memory and all registers except that holding parameters to be used in the system mode are cleared. System program, subroutine, calling from the application mode is effected with a mode change interrupt, from application mode to system mode. The direct addressing subroutine call from application program to system subroutine is not allowed. The change of operation mode from system to application is effected with another mode change interrupt function wherein all working memory and registers except that holding parameters to be used in the application mode are cleared in association with return to the address in stack.

Operation is commenced with the recognition by the CPU in the system mode of a custom command dedicated to a particular application program. The operating system in system mode then sets memory boundaries in at least one comparator or comparison register in which territory in memory by address is authorized as accessible by the particular custom command. Any request for memory outside of the address boundaries thus set results in a hardware interrupt constituting abnormal termination. Access of the application program is effected in application initialization with a mode change interrupt which parses the parameters to be used in the application mode, including the application program address which is put into registers, and clears all registers except those used for these parameters.

If the portion of memory territory requested in a call for any system or application program, subroutine, or data retrieval does not lie within the boundaries corresponding to the custom command utilized in application initialization a hardware interrupt is generated in which all working memory and registers are cleared and operation is terminated. A status word which yields an error code upon an associated external interface device may be forwarded as a parameter with clearing of all other registers. Upon application completion operation is terminated by return from an interrupt which further generates a status word indicating successful completion and conveying the execution result in registers and/or working memory with clearing of all other registers and working memory.

Operation in the application mode invariably ends with return to the system mode effected by a mode change interrupt clearing all working memory and registers except that used to forward a status word indicating successful completion and the execution result readable by an external interface device in the case of application completion or indicating abnormal termination with an error code readable by an external interface device in the case of an unauthorized access request or other condition resulting in an invalid access interrupt.

Use of an IC microprocessor possessing this system for the control circuitry of the same embedded in a card and further possessing external contacts for communication with an external interface device is a preferred use for an embodiment of the principles relating to the present invention. Therefore, the generation of the status word in the cases of abnormal termination and successful application completion facilitate the generation of, respectively, an error code or indication of successful execution with the execution result in communication with an external interface device. These capabilities are considered additionally optional to the hardware mode change interrupt which terminates operation and clears all working memory except that holding parameters necessary for forwarding the appropriate system status.

Other considerations which are within the ability of one practiced in the art but which will clearly set forth what is considered the best manner of making and using the preferred embodiments of the principles relating to the present invention set forth above may be readily comprehended with a reading of the detailed discussion following with reference to the drawings attached hereto and described briefly immediately below.

BRIEF DESCRIPTION OF THE DRAWINGS

FIG. 3 is a representation of the preferred sequence for application initialization and execution in accordance with the principles relating to the present invention.

FIG. 4 is a representation of the preferred sequence for system subroutine running from application mode in accordance with the principles relating to the present invention.

FIG. 5 is a representation of the preferred sequence for abnormal termination in accordance with the principles relating to the present invention.

DETAILED DESCRIPTION OF THE PREFERRED EMBODIMENT

A preferred embodiment of the principles in accordance with the principles of the present invention is intended for use as governing the control logic of a microprocessor contained within a single IC embedded within a card possessing external contacts for communication with an external interface device. At present, the number, dimensions, locations and functions of the contacts upon "Identification cards—Integrated circuit(s) cards with contacts—" is defined by ISO 7816 which first defines integrated circuit(s) as "Electronic component(s) designed to perform processing and/or memory functions" and an IC card as possessing "one or more integrated circuits". A minimum contact surface area is defined in part 2 by a rectangle measuring 2.0×1.7 mm each of which is located within a range defined in relation to the top left corner of the card face defining two columns of four contacts each, eight total, as seen in FIG. 1.

Figure 1:
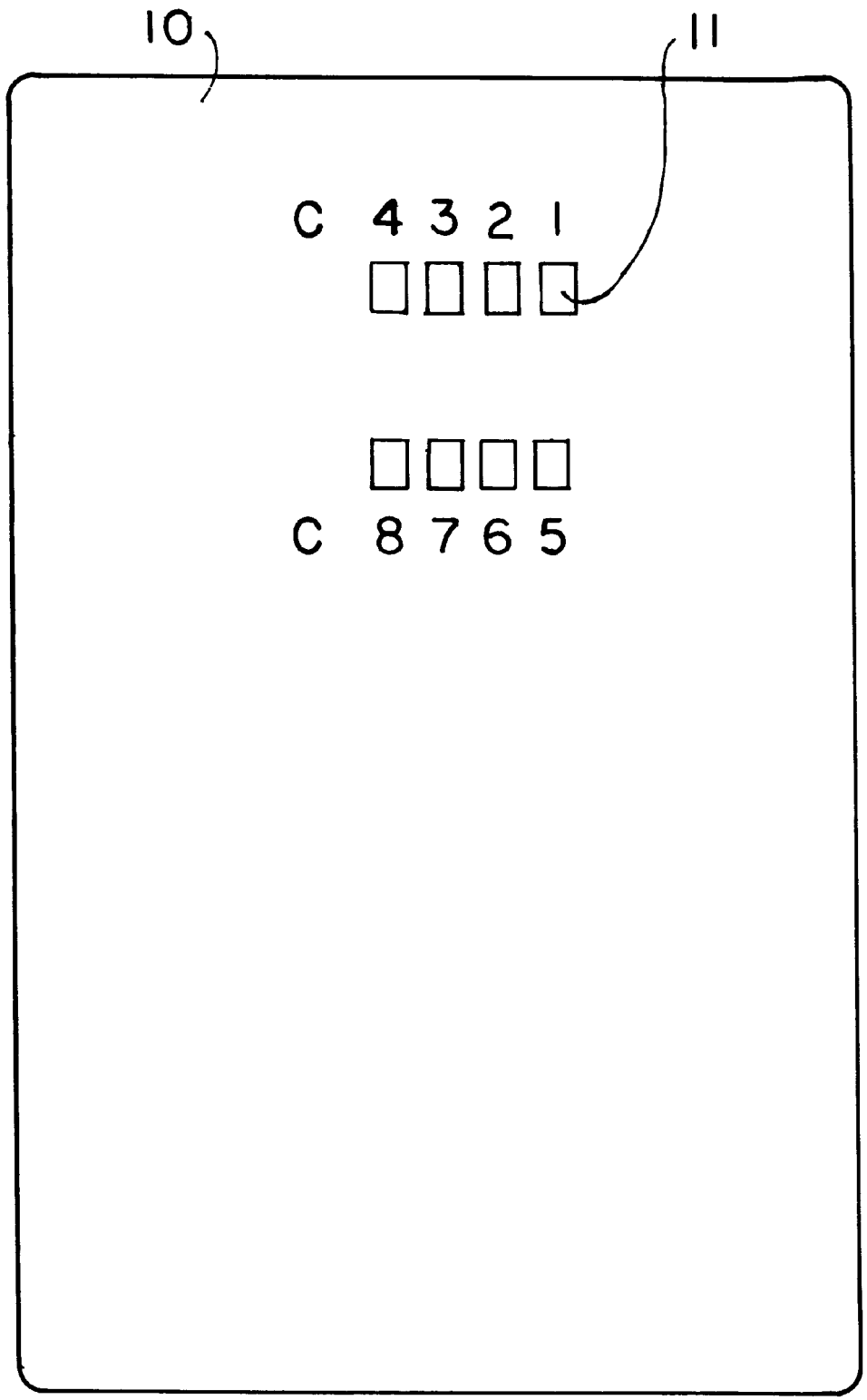
FIG. 1 is an isometric view of a plastic 'smart card' possessing external contacts for communication with an external interface device.

ISO 7816 Part 2 further identifies the contacts 11 as C1 through C8, also represented in FIG. 1 upon an IC card 10, and the function assigned to each:

C1: VCC (Supply voltage); C5: GND (Ground)
C2: RST (Reset signal); C6: VPP (Programming voltage)
C3: CLK (Clock signal); C7: I/O (Data input/output)
C4: reserved for future use; C8: reserved for future use.

Figure 2:
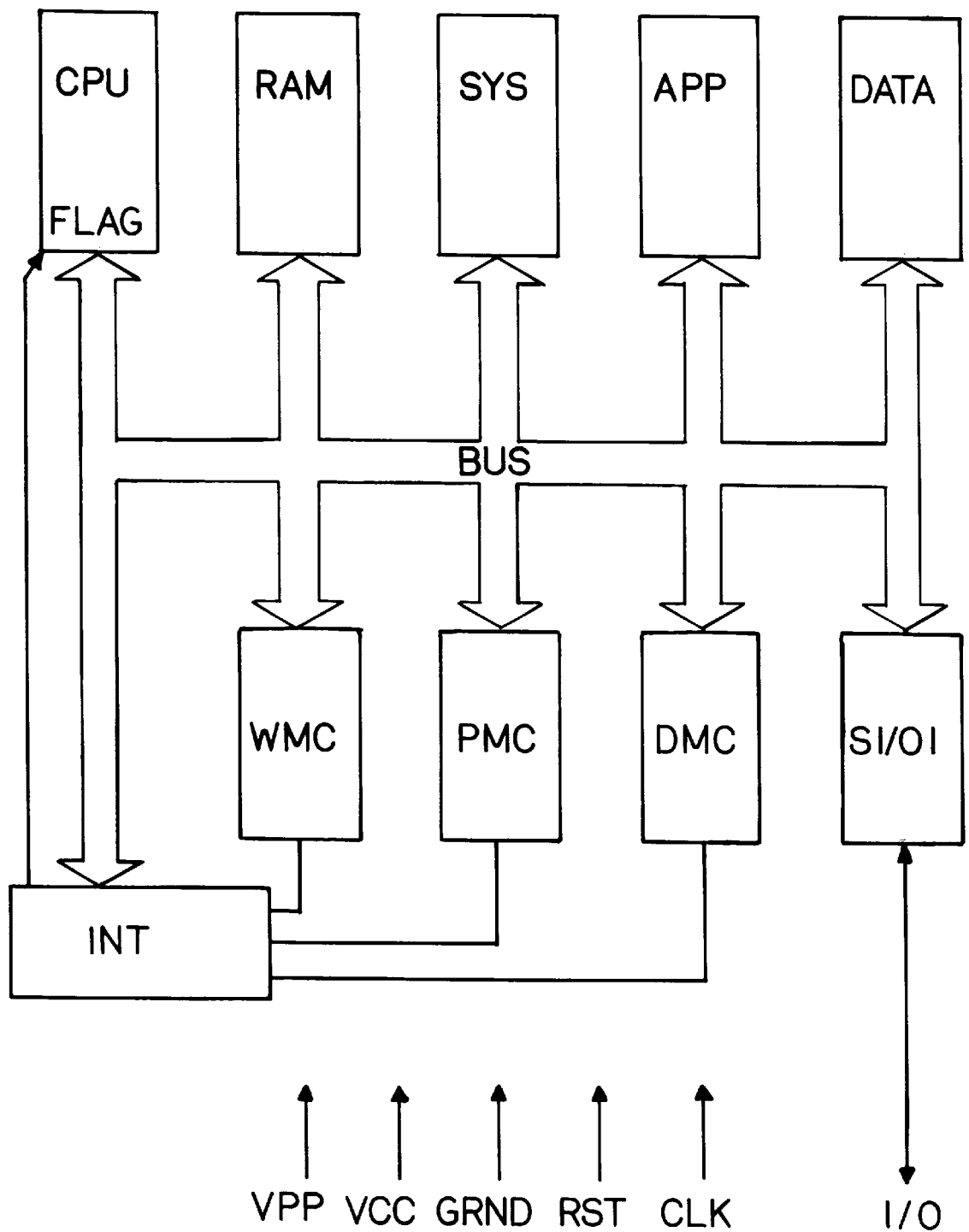
FIG. 2 is a depiction of a preferred secure multiple application IC card operating system configuration.

Three of the above elements are also represented in FIG. 2 along with three other elements: VPP (back up voltage), which is optional, GRND which is simply ground, and I/O which is input/output. Ground and I/O are necessary to operation, VPP is optional. All six of these elements are considered standard to current smart card operation.

ISO 7816 Part 3 describes the protocols for electronic signals and transmissions, including parameter construction, for IC cards.

These cards are identification cards intended for information exchange negociated (sic) between the outside and the integrated circuit in the card. As a result of an information exchange, the card delivers information (computation results, stored data), and/or modifies its content (data storage, event memorization). (ISO/IEC 7816-3: Introduction; 1989, (E))

It is further noted in the succeeding paragraph that "(d)uring the preparation of this International Standard . . . (r)elevant patents were identified in France and USA, (with) the patent holder being Bull S. A. in each case.

Among the other protocol descriptions set forth in ISO/EEC 7816-3, the structure and processing of commands is described in §8.2: "A command is always initiated by the interface device. It tells the card what to do in a 5-byte header, and allows a transfer of data bytes under control of procedure bytes sent by the card." A command header comprised of five successive bytes designated CLA, INS, P1, P2, P3 is defined in subsection 8.2.1. The first two bytes are the instruction class and code, the remaining three are parameters P1 and P2 are described as "a reference (e.g. an address) completing the instruction code" while P3 codes the number n of data bytes ($D_1$. . . $D_n$) which are to be transmitted during the command."The structure of this command header provides what is known herein as command syntax.

With regard to what is known herein as response syntax for signal transmission by the card to an interface device ISO 7816-3 states that "Three types of procedure bytes are specified:" acknowledge bytes or ACK upon which depends interface control of data exchange and of VPP state; NULL bytes which restarts the work waiting time and anticipates a subsequent procedure byte; and status bytes, SW1 which ensures VPP is idle for receipt "of an SW2 byte to complete the command. . . At each procedure byte, the card can proceed with the command by an ACK or NULL byte, or . . . conclude by an end sequence SW1–SW2." (ISO/IEC 7816-3 §8.2.2) The meaning of SW1 is defined as independent of the application "(w)hen the most significant half byte of SW1 is '6' . . . five values are defined:

| | |
|---|---|
| '6F' | The card does not support the instruction class. |
| '6D' | The instruction code is not programmed or is invalid. |
| '6B' | The reference is incorrect. |
| '67' | The length is incorrect. |
| '6F' | No precise diagnosis is given. |

Other values are reserved for future use by ISO/IEC JTCI/SC17. (ISO/IEC 7816-3 §8.2.2)

It is further stated that neither '9X' SW 1 bytes, nor SW2 bytes are interpreted; "their meaning relates to the application itself."

SW1–SW2 is known herein as a status word which either indicates successful completion, with the execution result, or indicates abnormal termination in an error code such as one of the five values defined above, both status words being readable by the interface device and preferably in accordance with current ISO standards regarding signal and transmission protocols. It is further understood that the operation of a control system in accordance with the principles relating to the present invention is preferably consistent with current ISO or equivalent standards.

FIG. 2 depicts the preferred secure multiple Application IC card configuration in accordance with the principles relating to the present invention. By adding the operation flag, which is denoted as FLAG in FIG. 2 within the CPU (central processing unit) and adding comparison registers, i.e. comparators, identified as WMC, (working memory comparator), PMC, (program memory comparator), and DMC, (data memory comparator) in FIG. 2 into the traditional microprocessor, provision is made for the security of each custom command supplied by the application provider when the IC card is utilized in conjunction with an external interface device which places the microprocessor in the IC card into communication with the application provider such as host computer system run by a banking institution.

The connection between the IC card and an interface unit is represented as I/O along the bottom of FIG. 2 and was discussed earlier in connection with standard smart card elements. The I/O is seen as a two-way connection between the interface device, which also supplies voltage, ground, reset and clock, and SI/OI (serial input/output interface) which is represented in line with the comparators, WMC, PMC, DMC which are seen to possess connection to INT (interrupt control logic) which is further connected to the CPU via the FLAG (operation flag). Changing of the operation flag is dependent upon the occurrence of a mode change interrupt which is governed by the interrupt control logic.

As further seen in FIG. 2, there is also a BUS which is an internal data, address and control bus between the ten elements represented as boxes: CPU, RAM, SYS, APP, DATA, INT, WMC, PMC, DMC and SI/OI. Most of these elements have already been defined. RAM, which is recognized as the standard acronym for random access memory, is, most importantly, in a functional definition, the working memory as known herein. SYS is the read only memory (ROM) for card operating systems which may be comprised of mask ROM, EEPROM or flash EEPROM as known in standard terminology. APP is the application customized commands which may be comprised of EPROM, EEPROM or flash EEPROM. DATA is data memory which may be comprised of EPROM, EEPROM or flash EEPROM. The other elements represented in FIG. 2 have been defined.

Most of the elements represented in FIG. 2 are conventional but the manner in which these elements function may readily be seen to be unconventional. The comparators are not used to verify a valid address, as may be considered conventional, but rather determine which memory areas are authorized by the particular custom command recognized as valid. The operation flag, as discussed earlier, determines the mode and is only changed in association with an interrupt which is governed by the control logic. When in the application mode none of the comparators are accessible and no other applications nor any other memory which is not authorized as accessible to the custom command authorized is permitted. The security of each application associated with a custom command is thus provided.

The logic governing a preferred control system in accordance with the principles relating to the present invention may be described in sequential manner, as depicted in FIGS. 3–5, which contain the preferred sequences for application initialization and execution, system subroutine running from application mode and abnormal termination, respectively. Many of the steps depicted, however, are necessarily associated, ie. must occur together, though one may precede the other without significant effect. The two cannot actually be simultaneous, but, in being necessarily associated, the functional effect is similar to simultaneity.

This relation holds between certain steps internal to a mode change interrupt wherein parameters including the return address and the operation flag are (1) put into stack; all other registers and working memory being (2) cleared. Although it may be preferred to place the required parameters in stack prior to clearing the other registers, the steps may readily be reversed since the register holding the required parameters is distinct from the others. In addition, the address requested must be within the boundaries set with use of at least one comparison register in the case of an interrupt effecting access of system memory, data, subroutine or program.

With reference to FIG. 3, it is noted that order of sequence involving placement into and retrieval from stack, as seen in substeps (5.a), (5.b), (7.a) and (7.b) must be as shown. This is for the reasons discussed immediately above in which it is seen that the request of a system address while still in application mode, i.e. prior to restoration of the operation flag for system mode from stack, will result in abnormal termination. Substep (4.d) may further become the first substep in step four and clear all registers and working memory. Some time in processing may be lost in clearing some of the registers and/or working memory and update in substeps (4.a, b & c), but some time in processing may be saved in utilizing a block memory fill. The substeps (4.a, b & c) may be taken in any sequence.

The initialization represented assumes an interface device for entrance of a valid custom command corresponding to one particular application and recognized by the microprocessor in the system mode. If the custom command is not recognized as valid, the operating system will send an error message in the status word and terminate the command. The memory address boundaries are set in at program and data memory comparison registers, preferably corresponding to the types of memory represented in FIG. 2 by the operating system in system mode before access to the application corresponding to the valid custom command utilized is allowed.

Thereafter, any attempt to access an address outside of these boundaries results in a hardware interrupt effecting abnormal termination. It is also necessary that these comparison registers be wholly inaccessible from application mode. For this reason, it is necessary always to restore the operation flag placed in stack prior to retrieving the system address in a return from mode change interrupt from application to system mode. Otherwise return to system mode with the stacked address would result in abnormal termination because it is impermissible for the operating system to yield a system address in the application mode because the boundaries set therein might be altered.

FIG. 4 depicts the preferred sequence replacing conventional system subroutine calling from application mode. Both steps 1 & 2 are similar to steps 4 and 5 in FIG. 3 except the mode, which is determined by the operation flag, is inverted. It is preferred that a flag for system mode only be used and application mode result from its absence. Step 3 in FIG. 4 is similar to substep 6.a in FIG. 3 but emphasis is placed upon it because a system address is being requested rather than an application address already authorized in initialization. Steps 4 and 5 in FIG. 4 correspond closely to steps 6.b, c & 7 and a last step similar to that in the previous Table is implied.

The difference between a register and working memory is that between CPU memory and RAM; data held in a register are accessed much more quickly. For this reason it is preferred that the result parsed be placed into a register, but if sufficient register memory space is lacking RAM will be required. In this case it is necessary to clear all working memory in the subsequent return from mode change interrupt in substep (4.b) except that utilized for storage of the result. It is assumed in the sequence outlined in FIG. 3 that sufficient register space exists for the requested address (1.a) and the necessary parameters (1.b). This may not be the case and working memory may be required for this if register space is insufficient. Clearing of all working memory (1.c) in this case would make an exception for that memory holding either the requested address or necessary parameters as required.

It is, however, considered preferable to avoid use of working memory for parameter and address storage prior completion of the mode change interrupt because of the loss of speed and because it is simpler to assure that all memory which is not necessary for the following step is cleared prior system operation. With the return address of the application program placed in stack and all working memory cleared during the mode change interrupt of the sequence, it is only necessary to maintain the registers holding the necessary parameters and clear all the working RAM other than the result once the result is obtained. This is considered to provide a relatively simple and therefore preferred manner of implementation. If RAM is required prior to the first mode change interrupt for the requested address, this memory may similarly be cleared in substep (4.b).

It is preferred that during application initialization the boundaries corresponding to the authorized custom command subsequently ensure that any request of memory possessing an address beyond these boundaries result in abnormal termination. A preferred sequence for this is depicted in FIG. 5 which comprises just two major steps, recognition of the invalid access attempt, and a hardware interrupt which resets the CPU and clears all working memory and registers after forwarding of an error message to the external interface device.

It is emphasized that the foregoing is intended to set forth what is considered the best manner of effecting an embodiment in accordance with the principles relating to the present invention and is unrestrictive in any manner whatsoever either of the scope of the invention or the corresponding property secured by Letters Patent for which I hereby claim:

1. A control system for a microprocessor, intended for use within an IC card supporting multiple applications, each said application being associated with a particular custom command, said control system comprising:

bi-modal CPU operation means, changing operation modes between system mode and application mode; the operation modes of said bi-modal CPU operation means being determined by an operation flag, wherein the changing of said operation flag is dependent upon an interrupt instruction function issued by an operating system;

an interrupt instruction function effecting a mode change from system mode to application mode places a return address for system mode and an original operation flag for system mode in stack, and clears all registers and working memory unnecessary for the next step in the application mode; wherein a mode change interrupt instruction function from application mode to system mode restores the operation flag placed in stack for system mode, returns to system with the stacked system address, and clears all registers and working memory except that holding parameters to be used in said system mode;

application initialization means for initializing in system mode including recognition of a utilized custom command and setting of memory boundaries in comparison registers corresponding to a particular application program given authorized access;

authorization means for authorizing access to a custom command and data files requested by the application program, whereby said boundaries set in said comparison registers by said application initialization means is utilized to reject any requested address outside said boundaries which attempt results in abnormal termination of operation which effects a hardware interrupt that causes all working memory and all registers which are not required for forwarding of an error signal to be cleared;

wherein said authorization means ensure that only memory having authorized access is accessible from a particular application held in said IC card, said application initialization means ensure said particular application corresponds to a valid custom command, which together with said bi-modal CPU operation means dependent upon an operation flag changed by one said mode change interrupt instruction function associated with clearing of all working memory and all registers unnecessary in the next mode ensure that comparison registers can not be accessed by any application, thereby securing each of the multiple applications upon an IC card.

2. A control system in accordance with claim 1, wherein said application initialization means first recognizes the custom command in said system mode as corresponding to one of the multiple applications and then proceeds through a mode change interrupt function effecting a change in mode from said system mode to application mode wherein the address of the application recognized and necessary parameters are placed in registers, all registers and working memory which are not used are cleared, the operation flag is changed and the application program is accessed from the register with the return address of the system mode placed in stack.

3. The control system of claim 1 wherein at least one said mode change interrupt function is generated by software utilizing a software interrupt instruction.

4. A control system in accordance with claim 3 wherein said mode change interrupt instruction from said system mode to said application mode is different than said mode change interrupt instruction from said application mode to said system mode.

5. A control system in accordance with claim 3 wherein a mode change interrupt instruction function from said system mode to said application mode and a mode change interrupt instruction function from said application mode to said system mode utilize the same instruction but a different indicator in a parameter.

6. The control system of claim 1 wherein the hardware interrupt is disabled during execution of a mode change interrupt, said hardware interrupt being enabled immediately after said mode change interrupt instruction.

7. The control system of claim 1 wherein the hardware interrupt is disabled during execution of a return from a mode change interrupt, said hardware interrupt being enabled immediately after return from a completed mode change interrupt instruction.

8. The control system of claim 1 wherein said comparison registers are inaccessible by an application program, the CPU generating a hardware interrupt when an attempt to modify a comparison register is made under application mode.

9. The control system of claim I wherein said comparison registers contain upper bounds and lower bounds of authorized memory access.

10. The control system of claim 1 wherein said comparison registers are comprised of three types: program memory comparison registers, data memory comparison registers and working memory comparison registers.

11. The control system of claim I wherein a request for a system subroutine in said application mode triggers a mode change interrupt function in which the requested address is placed in a register, parameters necessary for system mode are placed in registers and working memory if desired due to insufficient register space, the registers and working memory not utilized are cleared, the original operation flag and the return address of the application program are both placed in stack, and the operation flag is changed.

12. The control system of claim 1 wherein a request for a system subroutine in said application mode triggers a mode change interrupt function followed by verification of access authorization including the steps of accessing the subroutine requested, running said subroutine and placing the result into registers and into working memory if desired due to insufficient register space.

13. The control system of claim 1, wherein a request for a system subroutine in application mode triggers a mode change interrupt function followed by verification of access authorization which is further followed by a return from mode change interrupt in which all resisters and working memory which are not necessary for forwarding the result are cleared, the operation flag is restored with the stacked operation flag and return to the application program is effected with the stacked return address.

14. The control system of claim 1 wherein said abnormal termination includes the steps of recognizing an invalid access attempt with said comparison register in which said application boundaries are set, generating a hardware interrupt function and processing a hardware interrupt service routine including return of an error message in a status word to an external interface device and resetting of the CPU effecting clearing of all registers and working memory.

15. The control system of claim 1, wherein successful application completion is followed by placing the result in registers and working memory, clearing of unnecessary registers and all working memory, returning from mode change interrupt to said system mode and forwarding to an external interface device the result placed in a register in a status word.

16. The control system of claim 1 wherein any custom command required by more than one application program may be saved in the root level so that only one copy of the code corresponding to each custom command is necessary and memory space upon the microprocessor contained within the IC card thereby conserved.

17. The control system of claim 1 wherein a comparison register is comprised of a table of indexes which point to a list of memory blocks which indicate authorized access, and for which a request which is not present on the list results in generation of a hardware interrupt terminating operation.

18. The control system of claim 1 wherein a request for a block of working memory required by the application program must be made by the operating system in order to prevent a hardware interrupt triggered by attempted access of working memory beyond the boundaries contained in the pertinent comparison register.

19. The control system of claim 18 wherein release of the working memory requested is made prior to application program completion.

20. The control system of claim 18 wherein said release of requested working memory prior to application program completion is ensured by a garbage collection function.

* * * * *